Dec. 17, 1935.  E. WILDHABER  2,024,494
GEAR CUTTER
Filed Sept. 15, 1932  2 Sheets-Sheet 1
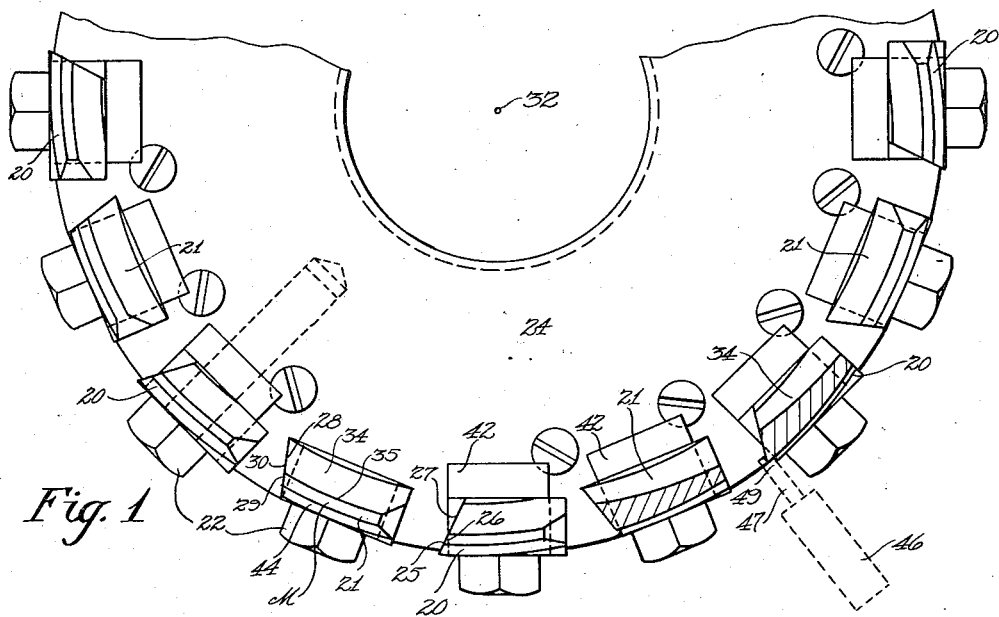
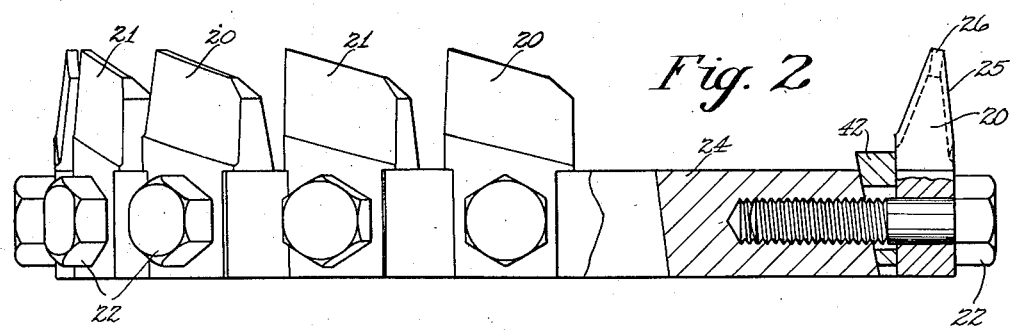
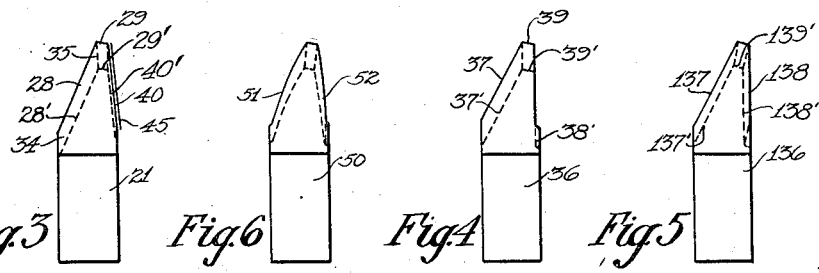
Inventor
Ernest Wildhaber
By
[signature]
Attorney Dec. 17, 1935.  E. WILDHABER  2,024,494
GEAR CUTTER
Filed Sept. 15, 1932  2 Sheets-Sheet 2

Inventor
Ernest Wildhaber
By
B. F. Schleninger
Attorney

Patented Dec. 17, 1935

2,024,494

UNITED STATES PATENT OFFICE 2,024,494

GEAR CUTTER

Ernest Wildhaber, Rochester, N. Y., assignor to Gleason Works, Rochester, N. Y., a corporation of New York Application September 15, 1932, Serial No. 633,246

8 Claims. (Cl. 29—105)

The present invention relates to gear cutters of the face-mill type such as are employed in the cutting of spiral bevel and hypoid gears.

For years, the standard practice in cutting spiral bevel and hypoid gears has been to cut the gear or larger member of the pair "spread-blade" and the pinion "single-side", that is, to cut the gear with a cutter so positioned as to cut simultaneously the two sides of a tooth space of the blank and to cut the pinion with a cutter so positioned that it cuts only one side tooth surface at a time.

A finish-cutting process in which two sides of a tooth space are cut simultaneously in the production of both the gear and the pinion is known as a duplex cutting process. Heretofore, however, there has existed no practical method which would permit cutting the tooth surfaces of the pinion as well as those of the gear two sides simultaneously and which would avoid an excessive "bias-bearing" condition when the two gears were run in mesh. Yet it is obvious that where the cutting operation can be so effected that two sides of a tooth space can be cut simultaneously, there is a gain in production over a method where only one tooth-side can be cut at a time and so for years efforts have been made to evolve a practical duplex cutting process. Recently, these efforts have been crowned with success. In my copending application, Serial No. 633,247 filed September 15, 1932, I have described a new method of cutting gears duplex which avoids all the practical objections which have heretofore militated against duplex cutting.

The primary purpose of the present invention is to provide a face mill gear cutter which will be suitable for use in duplex cutting processes and especially in this new duplex process. The cutter of the present invention may be used, however, with advantage where the side tooth surfaces of a pinion are cut one side at a time but both sides are finished on the same machine without any change in the ratio of generating roll or of the cutter between the cutting of the opposite sides tooth surfaces. Moreover, while the preferred practice is to use a standard tool in cutting the gear and to employ the cutter of the present invention only in cutting pinions, it is wholly practical to cut both members of a pair with a tool made according to present invention and this is especially so, when the tooth numbers of gear and pinion are comparatively small.

In the drawings:

Figure 1 is a fragmentary plan view of a face mill gear finishing-cutter constructed according to the present invention, two of the blades being shown in section;

Figure 2 is partly a front elevation and partly an axial section of the cutter shown in Figure 1;

Figure 3 is an end view of one of the inside cutting blades of the cutter of Figures 1 and 2;

Figures 4 and 5 are end views of a blade having an outside cutting edge of zero pressure angle and illustrating by comparison why an outside cutting blade of low pressure angle cannot be axially relieved and the effect of radial relief;

Figure 6 is a view of an outside cutting blade having a curved cutting edge;

Figure 7:
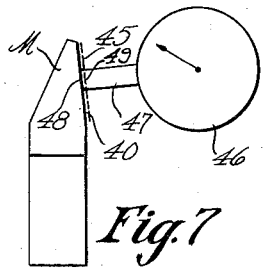
Figures 7 and 8 are diagrammatic views explanatory of the method of gauging the positions of the outside blades of a cutter constructed according to the present invention while using an inside blade as a master.

In the cutter of Figures 1 and 2 outside cutting blades 20 alternate with inside cutting blades 21. Each blade is secured by a bolt 22 in a radial slot cut in the rotary cutter head 24.

Each of the outside cutting blades 20 has an outside cutting edge 25 and a top cutting edge 26 formed by the intersection of the front cutting face 27 of the blade with the outside and top faces, respectively, of the blade. Each of the inside cutting blades 21 has an inside cutting edge 28 and a top cutting edge 29 formed by the intersection of the front face 30 of the blade with its inside and top faces, respectively. The front faces 27 and 30 of the blades are preferably planes and are inclined in opposite directions to provide the opposite side cutting edges.

In cutters of the present invention, the outside and inside cutting edges have widely different inclinations to the cutter axis. In the cutter of Figures 1 and 2, the outside cutting edges 25 are inclined at a comparatively small angle to the cutter axis 32, whereas the inside cutting edges 28 have a much larger inclination or pressure angle.

As is well known, the blades of a face mill gear cutter are relieved back from their cutting edges to provide cutting clearance and insure a free, clean cut. In the conventional type of face mill gear cutter, both the outside and inside cutting blades are relieved axially, that is, they are so relieved that the elements of the side surfaces of the blades are displaced with reference to one another axially of the cutter. This relief is ordinarily obtained by moving the relieving tool relatively in a direction parallel to the cutter axis as the blade on which the relieving tool is operating is carried past the relieving tool by rotation of the cutter. In the cutter of Figures 1 and 2, the conventional axial relief is retained on the inside blades 21. Hence, the inside surfaces 34 and top lines 35 of these blades are concentric with the cutter axis 32.

One of the inside blades of the cutter is shown in Figure 3. Due to the axial relief of these blades, the top cutting edge 29' and the inside cutting edge 28', which appear after the blade has been sharpened, are displaced in the direction of the cutter axis with respect to the original cutting edges 29 and 28. Because of this axial displacement, a face mill gear cutter having axially relieved blades must be adjusted axially after sharpening in order that its new cutting edges may cut in the same way as the original cutting edges. It will be seen that where the side cutting edge is inclined, as is the edge 28, at a substantial angle to the axis of the cutter, the lines 28 and 28' will have a sufficient normal distance from one another to give good cutting clearance and that, therefore, for blades of substantial pressure angle, axial relief is entirely suitable.

The situation is different, however, with respect to the outside blades 20. Due to the low pressure angle of the outside cutting edges, axial relief does not provide as much cutting clearance as is desired for effecting clean cuts, for obtaining a high rate of gear production, and for insuring long tool life. This is readily apparent from consideration of Figures 4 and 5. In Figure 4, a blade 36 is shown which has an inside cutting edge 37 which is of substantial pressure angle and an outside profile 38 which is parallel to the cutter axis, that is, of zero pressure angle. Axial relief will provide sufficient cutting clearance for the inside and top cutting edges 37 and 39, respectively, of the blade, as indicated by the dotted lines 37' and 39', respectively, but will provide no cutting clearance whatsoever for the outside profile 38. The outside surface of the blade will be wholly unchanged by the axial relief. It will remain a cylindrical surface concentric with the tool axis. It is obvious, then, that a blade having a cutting edge of zero pressure angle will not have any cutting clearance if relieved axially. Some radial relief must be resorted to, then, if the blade 36 is to be used for cutting. In a radially relieved blade, the elements of the side surface of the blade are displaced with reference to one another radially of the cutter axis. Pure radial relief may be obtained by moving the relieving tool relatively in a direction radial of the cutter axis as the blade on which the relieving tool is operating is carried past the relieving tool by rotation of the cutter. A method of providing combined radial and axial relief will be described hereinafter.

The effect of radial relief is clearly shown by comparison of Figure 4 with Figure 5. In Figure 5, a blade 136 is shown which is like the blade 36 in that it has an inside cutting edge 137 of large pressure angle and an outside profile 138 of zero pressure angle. The blade 136 is relieved, however, both radially and axially. The positions of the profiles of the blades after sharpening is indicated by the dotted lines 138', 139', 137'. It is seen that a side containing lines 138 and 138' will provide sufficient cutting clearance for an edge 138 even of zero pressure angle.

What has been said as to the insufficiency of axial relief on blades of zero pressure angle is true also with reference to blades having cutting edges of comparatively small pressure angle. Axial relief will not provide sufficient cutting clearance. So on the blades 21 of Figure 3, axial relief would not provide sufficient cutting clearance for the outside profile 40 which has a low pressure angle. The line 40' would not be sufficiently spaced normally from the line 40 to permit the edge 40, were it a cutting edge, to cut cleanly. Accordingly in a cutter made according to the present invention instead of all of the blades being relieved axially, the blades whose cutting edges are of low pressure angle, are relieved radially as well. Hence, in the cutter of Figures 1 and 2, the axially relieved inside blades 21 alternate without side blades 20 which are relieved downwardly (axially) and inwardly.

Now, when a blade is relieved radially, its cutting edge will be displaced radially of the axis of the cutter, after sharpening, with respect to its original cutting edge. To produce continuously the same tooth shape, then, such a blade must be adjusted radially in the cutter head after sharpening. This means that in the cutter of Figures 1 and 2, the outside blades 20 have to be adjusted radially outwardly of the cutter axis 32 each time that the cutter is sharpened and then the whole cutter has to be advanced axially toward the blank to compensate for the changed axial position of the resharpened axially relieved blades 21.

The outside blades 20 of the cutter 24 may be adjusted radially by loosening up on the bolts 22 and adjusting the wedges 42. After displacement of the blades, the bolts 22 are again tightened and the blades are again firmly held in their slots. Similar wedges 42 are also provided for adjusting the inside blades 21. Thus all the blades may be trued up precisely after sharpening so that all of the blades of each set may cut alike and produce very smooth tooth surfaces.

To assist in truing up the blades of a face mill gear cutter of the conventional type, ordinarily there are a master inside blade and a master outside blade provided and these blades are fixed in the head and the other outside or inside blades, as the case may be, are trued with reference to these two master blades. When blades are radially relieved, however, they have to be adjusted radially after sharpening. Hence, in the cutters of Figures 1 and 2, no fixed outside master blade could be provided. The lack of a master blade has always been one of the draw-backs of tools having radially-relieved blades.

In a cutter constructed according to the present invention, however, this deficiency can be obviated, for an inside master blade can be provided which may be employed not only in the truing of the inside blades but in the truing of the outside blades as well. The master blade has been designated as M. This may be the same as any of the other inside blades except for the fact that it is fixed and has no radial adjustment. The outside surface 44 of the blade like its inside surface 34, is relieved axially and the inclination of its outside surface is such that its outside edge 40 has the same inclination to the axis 32 of the cutter as have the outside cutting edges 25 of the outside blades 20. The point-width of the master blade is, of course, less than the distance between the outside cutting edges 25 and inside cutting edges 28 of the cutter, for the edge 40 of the master blade will not cut. The edge 40 is disposed in a conical surface spaced, therefore, from the conical surface in which the cutting edges 25 of the cutter lies, but having the same cone angle as the conical surface of these outside cutting edges.

After the outside blades have been sharpened, they should be adjusted with reference to the master blade M until the new cutting edges are spaced from the edge 40 at the same distance as there was between the two conical surfaces originally when the tool was new. In Figure 3, the line 45 is intended to indicate the position which an outside cutting edge 25 of the cutter should occupy relative to the edge 40 when the blades are correctly positioned. After sharpening, the new cutting edge of the radially relieved outside blades will lie inwardly of the line 45. The outside blades are, therefore, adjusted outwardly after sharpening until their new cutting edges coincide with the line 45. As the line 45 lies at a given radial distance from the profile 40 of the axially relieved master inside blade M, it will be clear, therefore, that the master inside blade can also be used as a master for the outside blades.

Figure 8:
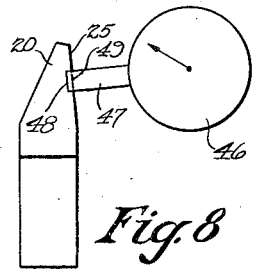

One way of gauging the position of the outside blades will now be described with reference to Figures 1, 7 and 8. A dial indicator 46 is provided with a plunger 47 having a stepped end comprising the flat end surface 48 and a second flat surface 49 spaced therefrom. The gauge is so disposed to the cutter that the two flat surfaces are substantially perpendicular to the cutting edges 25 and in an axial plane containing the cutter axis. The endmost surface 48 of the plunger is first brought into contact with the profile 40 of the master blade M. Then the inner flat surface 49 is brought into contact, as shown in Figure 1, with one of the outside cutting edges 25. The outside blade is then adjusted by movement of the associated wedge 42 until the indicator gives the same reading as on the inside master blade M.

Of course, instead of using an indicator with a special plunger, such as described, an ordinary dial indicator might be used instead and the outside blades adjusted with reference to the master blade by direct readings.

The present invention is not restricted to cutters whose blades have straight cutting edges. It may be used also on cutters whose blades have curved cutting profiles like the blade 50 shown in Figure 6 which has inside and outside profiles 51 and 52, respectively, that are curved. This blade has both axial and radial relief as indicated by the dotted lines.

Because of the difference in pressure angles between the outside and inside blades of a cutter constructed according to the present invention, it is necessary to tilt the cutter angularly with reference to the blanks in order to cut symmetrical teeth in the blank, that is, teeth whose opposite sides are of the same pressure angle. For this reason, the tips of the blade are inclined to the axis of the cutter at an acute angle so that when the cutter is tilted, the opposite side cutting edges will cut into the blank to the same depth. The tips 29 and 26 of the blade lie in a conical surface coaxial with the cutter.

The cutting faces 27 and 30 of the blades of the tool shown in Figures 1 and 2 have what is known as side rake. It is this sidewise inclination of the cutting faces with respect to axial planes which furnishes the keen side cutting edges. A tool of the character shown in Figures 1 and 2 is intended for finish cutting the tooth surfaces of a gear after the tooth spaces have been roughed out in a roughing operation. In order to rough cut efficiently, it is desirable to have very keen top-cutting edges also.

Figure 9:
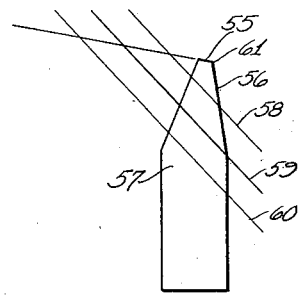
Figure 9 is a diagrammatic view illustrating the preferred construction of a roughing cutter made according to the present invention.
Figure 10:
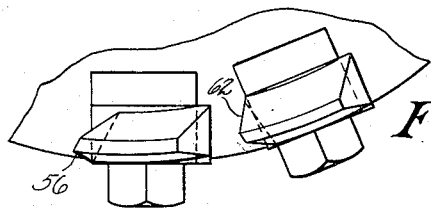
Figure 10 is a fragmentary plan view of a roughing cutter having its blades made according to the principles illustrated in Figure 9.

In Figures 9 and 10, there is indicated a preferable construction for a roughing tool made according to the present invention. 55 denotes a top cutting profile and 56 an outside cutting profile of a roughing blade 57. The cutting profile is understood to be the profile of an axial section of the surface of revolution described by a cutting edge in the rotation of the cutter. It is preferred to make the top rake and side rake equal. This equality of rake is obtained when the front cutting face of the blade 57 is so inclined rearwardly and sidewise with reference to an axial plane of the cutter which passes through the cutting profile that lines 58, 59 and 60 of constant distances from said axial plane intersect the profiles 55 and 56 at equal distances from the intersection point 61 of these profiles. In plan view, the opposite side cutting edges 56 and 62 (Figure 10) appear to be forwardly tilted while at the same time the front faces of the blades are so sidewise inclined as to provide a proper side rake.

Figure 11:
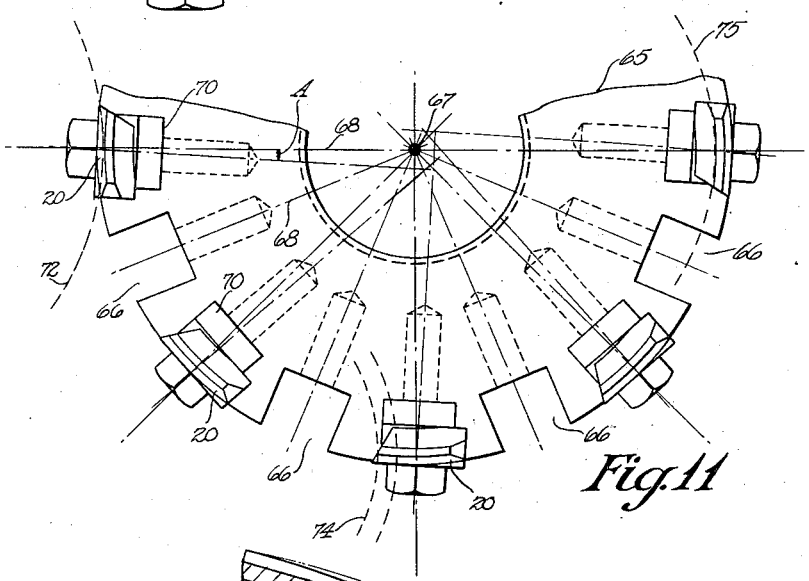
Figures 11 and 12 are a fragmentary plan view and side elevation, respectively, illustrating the preferred method of relieving the outside cutting blades of a cutter such as shown in Figures 1 and 2.
Figure 13:
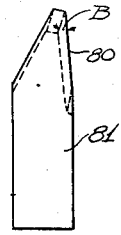
Figure 13 is an end view of an outside cutting blade made according to a preferred embodiment of my invention.
Figure 12:
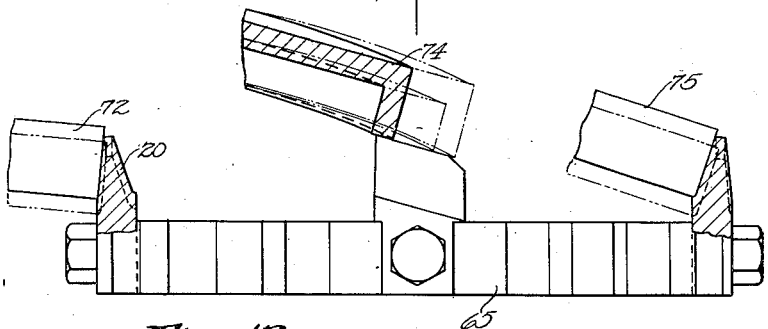

Various methods may be used for relieving the blades of cutters constructed according to the present invention. A preferred method is to relieve the blades on standard spiral bevel gear cutter relieving machines by the use of dummy heads. Figures 11 and 12 show diagrammatically how this may be done.

65 designates a dummy head. This head is provided with two series of alternating slots 66 and 70. The slots 66 of one series are radial of the axis 67 of the head just as are the slots of the cutter 24 itself. They are symmetrical with reference to radial lines 68 passing through the axis of the head. The alternate slots 70 are, however, tilted with reference to radial lines 68 and the angle A of the tilt is equal to the angle of radial relief which it is desired to provide on the outside blades of the cutter.

With this arrangement, the same relieving cam may be used in relieving both the outside and inside blades, and outside, inside and top surfaces may be simultaneously ground on either the outside or inside blades in an operation in which the relieving motion is in a direction axial of the dummy head. In order to provide sufficient clearance for the grinding wheels, one set of blades will be relieved first, for instance, the outside set of blades. Then these blades will be taken out of the cutter head and the other set of blades positioned therein and relieved.

With the dummy head described, the relieving motion may be identical with that ordinarily employed, and described, for instance, in the patent to James E. Gleason No. 1,285,124 of November 19, 1918.

Three grinding wheels are provided. The wheel 72 grinds the outside surfaces of the blades, the wheel 74 the top surfaces and the wheel 75 the inside surfaces. The wheels are rotated on their respective axes in engagement with the blades, while the dummy head 65 is rotated on its axis and while simultaneously a relative relieving movement is imparted between the wheels and the dummy head along the axis of the dummy head. The positions assumed by the three wheels in the relieving of the blades are indicated in dotted lines in Figure 12. The outside cutting blades 20 are shown in the process of being relief ground. Due to the skew or tilted position of these blades in the dummy head, their surfaces will be ground with a combined axial and radial relief and so will have the cutting clearance which is desired. By removing the outside blades from the dummy head and positioning the inside blades in the slots 66, these latter blades may be ground, but due to the fact that the slots 66 are radial, these inside blades will be axially relieved only and this is so, even though the motion employed in the two relieving operations be the same.

It will be obvious, of course, that instead of grinding the inside blades in the dummy head, they might be ground instead in their own head 24 and the outside blades only ground in the dummy head. In this case, the dummy head need only be provided with oblique slots.

As pointed out above, the amount of normal relief determines the amount of cutting clearance. Because of the high pressure angle of the inside cutting edges, sufficient normal relief can be obtained with an axial relief less than that used conventionally. About two thirds of the heretofore standard relief is all that is required to provide sufficient cutting clearance for the inside cutting edges of a tool such as shown in Figures 1 and 2. The normal relief of the outside blades of this cutter is increased to a practical amount through provision of radial relief in addition to the axial relief. Preferably, the normal relief of the outside cutting edge is made substantially equal to the amount of normal relief of the axially relieved inside cutting edge 28. In this case, the direction of relief is inclined at substantially the same angle B to the outside cutting profile 80 of the outside blade 81, as the axis is inclined to the direction of the inside cutting profile 28. In other words, the angle B will equal the pressure angle of the inside cutting edge. When the amount of relief on the outside and inside blades have this relation, substantially uniform cutting clearance is provided on the outside and inside cutting edges.

While several different embodiments of the invention have been described, the invention is capable of still further modification. In general, it may be said that the present application is intended to cover any adaptations, uses, or embodiments of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. A gear cutter comprising a rotary head and a plurality of annularly arranged cutting blades which project from the head in the general direction of the axis of the head, certain of said blades having cutting edges at one side and others of said blades having cutting edges at their opposite side, the opposite side cutting edges being differently inclined to the axis of the cutter, the blades whose cutting edges have the smaller inclination to the axis of the cutter being relieved back of their cutting edges in a direction radial of the cutter axis and the blades whose cutting edges have the larger inclination to the cutter axis being relieved back of their cutting edges in a direction parallel to the cutter axis.

2. A gear cutter comprising a rotary head and a plurality of annularly arranged cutting blades which project from the head in the general direction of the axis of the head, certain of said blades having cutting edges at one side and others of said blades having cutting edges on their opposite sides, the opposite side cutting edges being differently inclined to the axis of the cutter, the blades whose cutting edges have the smaller inclination to the axis of the cutter having a combined radial and axial relief and the blades whose cutting edges have the larger inclination to the cutter axis being relieved back of their cutting edges in a direction parallel to the cutter axis.

3. A gear cutter comprising a rotary head, a plurality of annularly arranged cutting blades which project from the head in the general direction of the axis of the head, alternate blades having their front faces sharpened in opposite directions to provide opposite side cutting edges, the inside cutting edges being inclined to the axis of the cutter at a greater angle than the outside cutting edges, the inside cutting blades having their inside faces relieved back of their inside cutting edges in a direction parallel to the cutter axis and the outside cutting blades having their outside faces relieved back of their outside cutting edges in a direction radial of the cutter axis, and means for adjusting said outside blades in the cutter head in a direction radial of the cutter axis.

4. A gear cutter comprising a rotary head, a plurality of annularly arranged cutting blades which project from the head in the general direction of the axis of the head, each of said blades having side and top cutting edges, alternate blades having their side cutting edges arranged on opposite sides, the blades which have inwardly disposed cutting edges being relieved back of their top and inside cutting edges in a direction parallel to the cutter axis and the blades which have outwardly disposed cutting edges being relieved back of their top and outside cutting edges both radially and axially of the cutter axis, and means for adjusting the outside cutting blades in the cutter head in a direction radial of the cutter axis.

5. A gear cutter comprising a rotary head, a plurality of annularly arranged cutting blades which project from the head in the general direction of the axis of the head, alternate blades having opposite side cutting edges, which are differently inclined to the axis of the cutter, the blades whose cutting edges have the smaller inclination to the axis of the cutter being relieved back of their cutting edges in a direction radial of the cutter axis and the blades whose cutting edges have the larger inclination to the axis of the cutter being relieved back of their cutting edges in a direction parallel to the cutter axis, one of the latter blades being fixed in the cutter head and having its non-cutting side also relieved in the direction of the axis of the cutter, and the remainder of said blades being radially adjustable in the cutter head.

6. A gear cutter comprising a rotary head, a plurality of annularly arranged cutting blades which project from the head in the general direction of the axis of the head, alternate blades having opposite side cutting edges, the inwardly disposed side cutting edges being inclined at a greater angle to the axis of the cutter than the outwardly disposed cutting edges, all of the blades which have inwardly disposed cutting edges being relieved back of said cutting edges in a direction parallel to the cutter axis and one of the blades which had an inwardly disposed cutting edge being fixed in the cutter head and having both side faces relieved back of its front face in a direction parallel to the cutter axis, the blades which have outwardly disposed cutting edges having a combined radial and axial relief back of their cutting edges, and means for adjusting all of the blades in the cutter head, except said one fixed blade, in directions radial of the cutter axis.

7. A gear cutter comprising a rotary head having a plurality of annularly arranged cutting blades which project from the head in the general direction of the axis of the head, alternate blades having opposite side cutting edges, the two groups of side cutting edges being differently inclined to the axis of the cutter, the blades whose cutting edges have the larger inclination to the axis of the cutter being relieved back from their cutting edges in a direction parallel to the axis of the cutter and the blades whose cutting edges have the smaller inclination to the axis of the cutter having a combined radial and axial relief, the direction of radial relief of each of the latter group of blades being inclined to the cutting edge at approximately the same angle as the cutting edges of the first group of blades are inclined to the axis of the cutter.

8. A gear cutter comprising a rotary head and a plurality of annularly arranged cutting blades which project from the head in the general direction of the axis of the head, certain of said blades having cutting edges on one side and others of said blades having cutting edges on the opposite side, and one group of blades being relieved axially back of their cutting edges and the other group of blades being relieved radially back of their cutting edges.

ERNEST WILDHABER.